(12) United States Patent
Ziolkowski et al.

(10) Patent No.: US 6,690,278 B2
(45) Date of Patent: Feb. 10, 2004

(54) ELECTRONIC MARKER FOR METALLIC VALVE BOX COVERS

(75) Inventors: Christopher J. Ziolkowski, Elmhurst, IL (US); Albert W. Gershman, Matawan, NJ (US)

(73) Assignee: Gas Technology Institute, Des Plaines, IL (US)

( * ) Notice: Subject to any disclaimer, the term of this patent is extended or adjusted under 35 U.S.C. 154(b) by 27 days.

(21) Appl. No.: 10/034,604

(22) Filed: Dec. 28, 2001

(65) Prior Publication Data
US 2003/0122674 A1 Jul. 3, 2003

(51) Int. Cl.[7] .............................................. G08B 13/14
(52) U.S. Cl. ................. 340/572.1; 340/572.2; 340/572.3; 340/572.5; 340/572.8; 340/825.49
(58) Field of Search .................. 340/571, 572.1, 340/572.2, 572.3, 572.4, 572.5, 572.7, 572.8, 572.9, 825.49

(56) References Cited

U.S. PATENT DOCUMENTS

| | | |
|---|---|---|
| 3,689,842 A | 9/1972 | Meed |
| 3,975,735 A | 8/1976 | McCullough et al. |
| 4,215,343 A | 7/1980 | Ejiri et al. |
| 4,334,227 A | 6/1982 | Marks |
| D269,664 S | 7/1983 | Marks |
| 4,656,478 A | 4/1987 | Leuenberger |
| 4,761,656 A * | 8/1988 | Cosman et al. ............. 340/571 |
| 4,873,533 A | 10/1989 | Oike |
| 4,963,887 A | 10/1990 | Kawashima et al. |
| 5,099,227 A | 3/1992 | Geiszler et al. |
| 5,413,134 A * | 5/1995 | Burgess et al. ................ 137/1 |
| 5,619,207 A | 4/1997 | d'Hont |
| 5,682,141 A | 10/1997 | Morimoto |
| 5,767,816 A | 6/1998 | Cosman |
| 5,771,835 A | 6/1998 | Schneider |
| 5,864,323 A | 1/1999 | Berthon |
| 5,877,703 A | 3/1999 | Bloss, Jr. et al. |
| 5,999,107 A | 12/1999 | Cooper et al. |
| 6,026,818 A | 2/2000 | Blair et al. |
| 6,049,279 A | 4/2000 | Minarovic |
| 6,246,328 B1 * | 6/2001 | Parkinson et al. ........ 340/572.1 |
| 6,380,857 B1 * | 4/2002 | Galloway et al. ........ 340/572.8 |
| 6,388,575 B1 * | 5/2002 | Galloway ................ 340/572.1 |

FOREIGN PATENT DOCUMENTS

JP        10265045 A    *    3/1997

\* cited by examiner

*Primary Examiner*—Jeffery Hofsass
*Assistant Examiner*—Daniel Previl
(74) *Attorney, Agent, or Firm*—Mark E. Fejer

(57) ABSTRACT

A valve box having a metallic riser and a metallic lid covering a top of the metallic riser and an electromagnetic resonator coupled to the valve box interior facing side of the metallic lid, whereby, upon generation of an eddy current in the metallic lid, a current is generated in the electromagnetic resonator. This valve box, when buried, is readily locatable and identifiable by an above-ground interrogating device.

11 Claims, 4 Drawing Sheets

ELECTRONIC MARKER FOR METALLIC VALVE BOX COVERS

BACKGROUND OF THE INVENTION

1. Field of the Invention

This invention relates to an electronic marker for metallic valve box covers which provides a means by which the valve box cover can be located and uniquely identified.

2. Description of Prior Art

Buried valve boxes are commonly employed in gas and water distribution systems. There are a large number of valve boxes presently installed, and their number is increasing. To keep track of these installed valve boxes, some form of electronic location and identification is desirable. One common form of valve box consists of a metallic lid set in an all-metal riser. However, this type of valve box is problematic due to the substantial attenuation of radio waves caused by the metal.

A number of passive radio-frequency tagging systems are known. These systems consist of passive tags, or transponders, and an interrogating device. In operation, the interrogating device emits a pulse of RF energy of sufficient duration to "charge" any transponders in the immediate vicinity and then passively listens for any return signals. This cycle can be repeated numerous times. The interrogating device provides the operator with both visible and audible indications of proximity to the transponder. In cases where the transponder transmits an ID code, this code is also displayed by the interrogating device.

The majority of commercial tagging devices use a resonant antenna tuned to the same frequency as the interrogating device. Exploiting the effect of resonance allows the tag to absorb and store sufficient energy to produce a locating signal. The principle is that the resonant antenna will absorb more energy than it loses during each cycle of the radio wave generated by the interrogating device. In a properly constructed resonator, resistance losses and core losses will be low. Low losses means that the energy is available to perform location and identification functions.

Conventional electronic marker devices for buried valve boxes in use today comprise a tuned circuit sealed within a plastic envelope. The tuned circuit is made of a circularly wound coil of wire connected in parallel with a capacitor, with the assembly having a generally toroidal configuration. The coil is banded or tied at several peripheral locations. The plastic envelope has a generally "U"-shaped periphery with the side at the top of the "U" being initially open, and being sealed after the tuned circuit assembly has been inserted. The coil assembly may typically have a diameter of approximately twelve inches, with the "U" portion of the envelope interior being sized to receive the coil assembly peripheral shape with minimal distortion.

U.S. Pat. No. 4,761,656 teaches a passive marker device which is selectively placed relative to various portions of buried utilities such as gas, telephone, water and power lines, for use in locating such portions when necessary. The passive marker device includes a tuned circuit enclosed in a housing which includes a base member having an upstanding rim with a cover member bonded to the rim and to a central portion of the base member. An opening is provided that extends through the housing at the central portion of the housing. A boss which is recessed on the side of the base member that is away from the cover extends from the central portion of the base member to the cover member.

U.S. Pat. No. 6,049,279 teaches a conduit end cap adapted to house a transponder or electronic marker enabling the later location of a non-conductive plastic conduit end using above-ground sensors. The transponder conduit end cap includes a transponder housing having two flat, generally parallel walls defining a cavity, a transponder (either active or passive) located in the housing, and a fitting which attaches the transponder housing to the end of the conduit to thereby seal the conduit. The transponder axis is maintained by a predetermined orientation such as by partially filling the cavity with a liquid and using a buoyant envelope to contain the transponder.

U.S. Pat. No. 5,767,816 teaches a device which uses electromagnetic signals to mark or locate obscure articles, in particular, passive resonant circuits having ferrite cores which are used to mark buried cables and pipe. The passive electronic marker uses a plurality of ferrite cores to increase locating range and the cores are attached in such a manner that a slight bend of the marker at a junction between the cores does not significantly affect the marker's performance. Stable locating range and frequency are achieved by controlling the air gap between the cores. By selecting the appropriate geometry for the core ends and winding interconnections, the first order permeability across the air gap is held constant during bending of the marker. See also U.S. Pat. Nos. 4,656,478, 4,334,227 and 5,099,227.

SUMMARY OF THE INVENTION

It is one object of this invention to provide an electronic marker for locating and identifying buried objects such as metallic valve boxes.

It is another object of this invention to provide a means for retrofitting a radio frequency location and identification tag to an existing all-metal valve box.

It is yet another object of this invention to provide an electronic marker for metallic valve boxes which addresses the problem of radio wave attenuation due to the shielding effect of the metal.

These and other objects of this invention are addressed in a valve box comprising a metallic riser and a metallic lid covering the top of the metallic riser by an electromagnetic resonator coupled to the valve box interior facing side of the metallic lid, whereby upon generation of an eddy current in the metallic lid, a current is generated in the electromagnetic resonator. The electromagnetic resonator preferably comprises an inductor wound on a ferrite rod in parallel with a capacitor. The key to operation of this invention is the degree of electromagnetic coupling between the electromagnetic resonator and the metallic lid.

The coupling is controlled by an air-gap between the ferrite rod and the bulk material of the lid. This coupling allows the transfer of energy between the lid and the resonator. The electromagnetic resonator stores energy while the interrogating device is active. The efficiency of the energy storage is proportional to the Q of the entire system. When the interrogating signal is removed, the stored energy in the resonator dissipates in the form of radio waves, as a result of which the location of the valve box can be identified.

The coupled system of the metallic lid and the electromagnetic resonator will always have a lower Q than the resonator alone. Consequently, the resonator must have a very high Q, where Q is a measure of the combined losses in the wiring and the core material. If the system is overcoupled, that is, the air-gap is too small, the Q of the system will approach that of the lid itself. The ohmic losses of the system will, thus, be high. The resonator will not store sufficient energy to radiate a location signal or power identification circuitry. If the system is under-coupled, due to a too large air-gap, insufficient energy will be transferred from the lid to the resonator. The Q of the system approaches the Q of the resonator, but the available energy is low.

The system of this invention can be modeled as a transformer with three windings. The primary winding that supplies the power is the interrogating coil. The lid can be modeled as a one-turn winding and part of the transformer core. The third winding is the coil of the resonator. The lid transfers energy from the interrogating coil to the resonator but has resistive losses. The resonator sees these losses as impedance to be matched to the impedance of the resonator. When impedance matching is achieved, the energy transferred to the resonator is maximized.

BRIEF DESCRIPTION OF THE DRAWINGS

These and other objects and features of this invention will be better understood from the following detailed description taken in conjunction with the drawings, wherein.

DESCRIPTION OF PRESENTLY PREFERRED EMBODIMENTS

The invention disclosed herein is a method and apparatus for locating and identifying buried valve boxes. The apparatus comprises an antenna for locating and identifying valve boxes comprising a metallic valve box cover or lid having a downward projecting circumferential lip and a high Q resonator coupled to the metallic valve box cover in such a fashion that a high Q is maintained. The resonator comprises an inductor wound on a ferrite rod in parallel with a capacitor. The coupling means is an appropriately dimensioned air-gap between the interior faces of the downward projecting circumferential lip of the valve box cover or lid and the ends of the ferrite rod. In accordance with one embodiment of this invention, the ferrite rod and the necessary support circuitry are disposed in a prefabricated enclosure in the appropriate orientation such that when the enclosure is bonded to the interior of a standard metallic valve box cover, proper coupling is achieved.

Figure 1A:
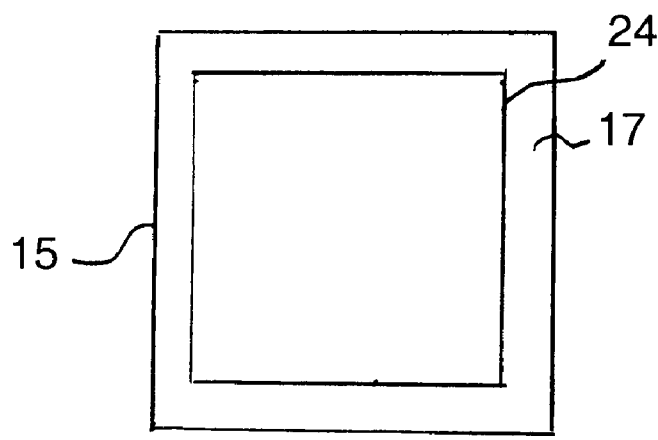
FIG. 1a is a bottom view of a valve box lid for a valve box in accordance with one embodiment of this invention.
Figure 1B:
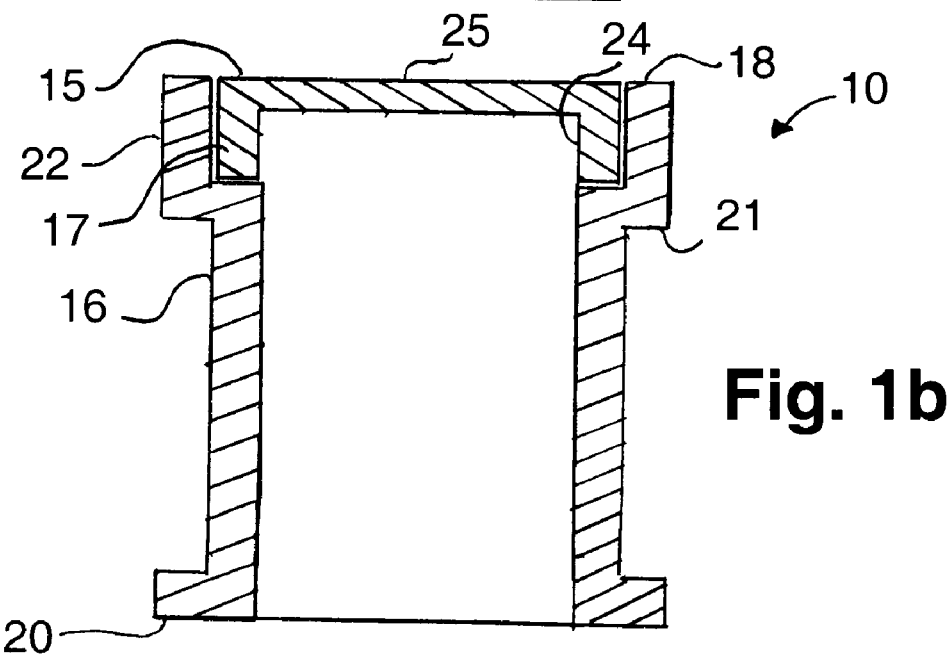
FIG. 1b is a cross-sectional lateral view of a riser and lid for a valve box in accordance with one embodiment of this invention.
Figure 1C:
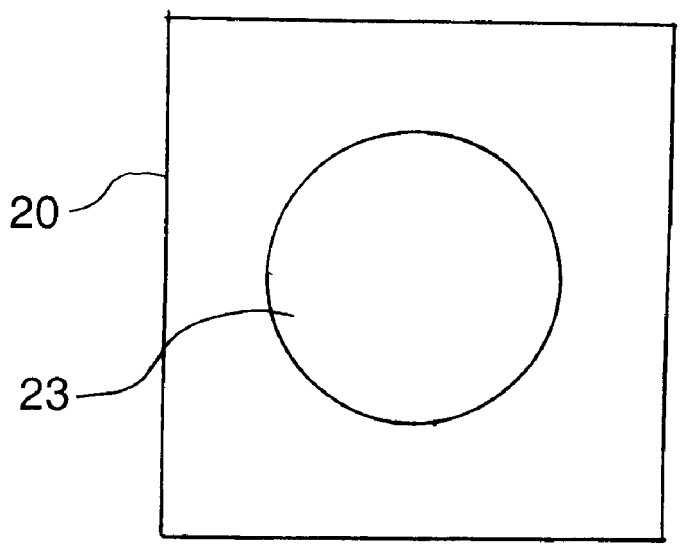
FIG. 1c is a bottom view of a riser bottom for a valve box in accordance with one embodiment of this invention.

FIGS. 1a–1c depict the components of a conventional valve box used in gas and water distribution systems in diagrammatic form. The valve box 10 comprises a metallic valve box cover or lid 15 and a metallic riser 16 having a bottom flange 20 and a top flange 21. The top flange 21 is provided with a raised circumferential lip 22 to retain lid 15. Metallic valve box cover 15 comprises a circumferential lip 17 as shown in FIG. 1a, which circumferential lip, when the valve box cover 15 is disposed on top of metallic riser 16, is oriented in the direction of the riser 16, as shown in FIG. 1b. As shown in FIG. 1b, the distance between the sides of metallic riser 16 is larger at the top end 18 of riser 16 to accommodate metallic valve box cover 15 within the end portion of riser 16.

By way of example, a valve box comprising two pieces, the riser and the cover or lid, both of cast iron, was constructed. The riser of the valve box was an 8-inch in diameter by 16-inch high cylinder with square flanges cast at each end. The foot of the riser was a square plate with a circular opening 23 matching the inner diameter of the cylinder as shown in FIG. 1c. The lid or cover was 8 inches square with a downward projecting circumferential lip. The lid of a valve box is, of necessity, quite massive, requiring substantial effort to be removed from within the circumferential lip of the top flange. This massiveness is required to enable it to withstand vehicular traffic and so that it cannot be easily dislodged. As a result, it is apparent that replacement of the cast iron lid with a composite material that is transparent to radio waves is not an option.

A number of experiments were carried out using commercial 3M SCOTCHMARK® tags available from 3M Corporation inside a valve box. No placement or orientation of the commercial air core tags provided a usable return signal in the vicinity of the lid. An attempt was made to construct a custom transponder by placing a winding about the circumference of the cylindrical portion of the box. This also was unsuccessful due to the ferromagnetic properties of the cast iron. The ferrite cores used for the winding of AM antennae are precision-engineered materials. Simple cast iron has a much higher conductivity than commercial ferrites, leading to resistive losses as eddy currents in the cast iron.

Figure 2A:
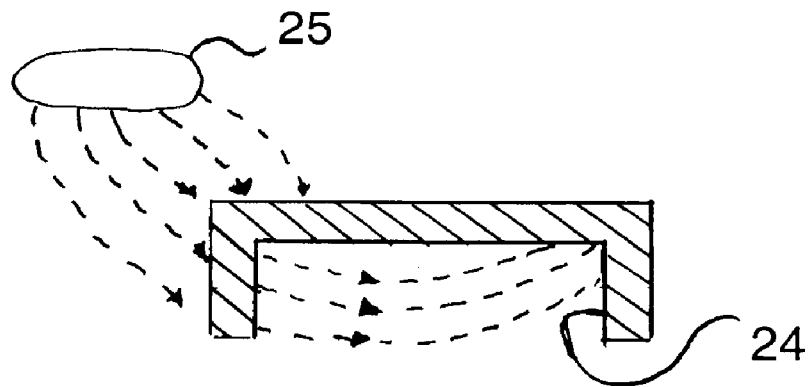
FIG. 2a is a diagram showing a cross-sectional lateral view of a valve box lid and the magnetic flux produced by eddy currents generated by an interrogating device in accordance with this invention.

During the course of these experiments, the interior portion of the cover was instrumented with pickup coils to determine the amount of radio frequency signal penetrating the lid. The signal originated from a resonant coil antenna outside of the valve box. The driving frequency was 83 kHz to maintain compatibility with the 3M SCOTCHMARK system for gas. As a result, we discovered that the magnetic flux emanating from the interior 24 of the lip 17 of the cover 15 was at least an order of magnitude greater than from any other point on the cover's interior. As shown in FIG. 2a, the flux direction is normal to the interior surface of the lip, perpendicular to the surface 25 of the cover facing away from the riser. This effect was observed both when the lid was in the riser socket formed by the top flange 27 of the riser 16 and when the lid 15 was standing free.

Figure 3A:
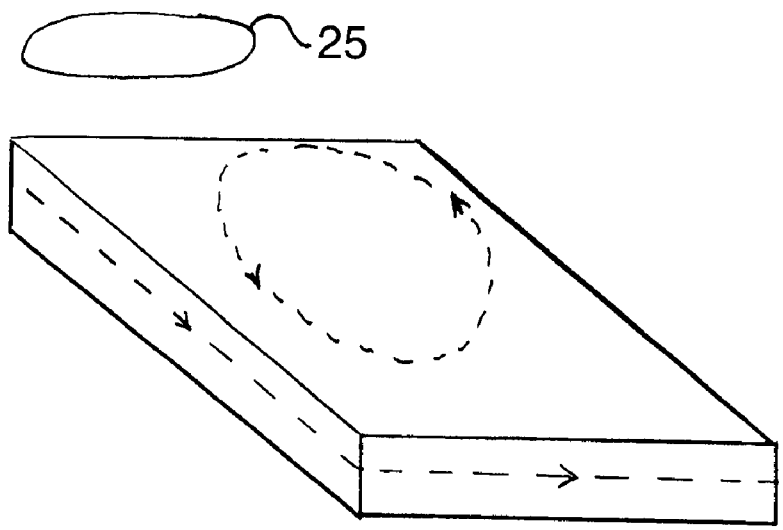
FIGS. 3a and 3b are diagrams showing the effect of placement of the drive coil with respect to the valve box lid on the distribution of eddy currents.
Figure 3B:
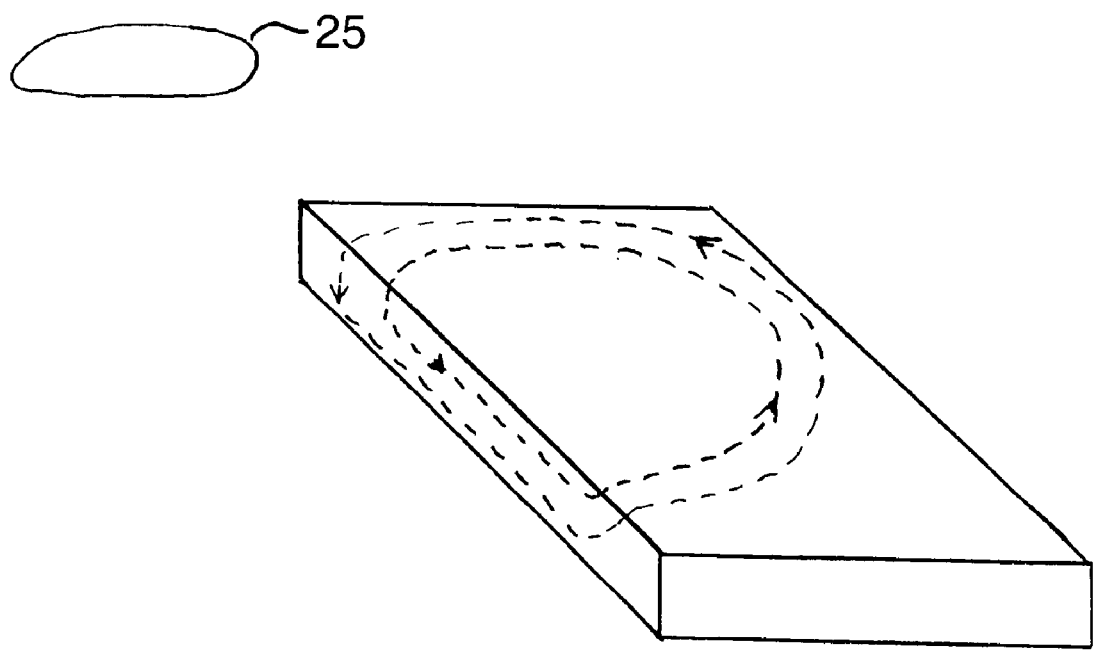

Although not wishing to be bound by any particular explanation as to the manner of operation, we believe that the flux concentration effect can be explained as follows. When magnetic flux is driven into the valve box cover by an exterior, or interrogating, coil 25, this flux induces eddy currents in the metal of the valve box cover, which, in turn, produce magnetic flux inside the cover as shown in FIG. 3a. The surface area of the lip of the cover, as seen edge-on, is much smaller than the area of the top. This reduced area concentrates the eddy currents, and the resulting magnetic flux, into a smaller region. As shown in FIG. 3b, this effect is maximized when the diameter of the interrogating coil is aligned with an edge of the lid.

This suggests that a properly designed transponder, housed within the cavity of the lid, could use the lid as part of the antenna. The entire antenna preferably is resonant at 83 kHz to satisfy compatibility issues and the resonant element must have a sufficiently high Q when in place. The Q is a measure of the losses in the resonator. We have determined that commercial tags with ferrite cores provide the best performance in the presence of a nearby metal. Simple air core hoop coils suffer from drastically lower Q's in the presence of metal.

Figure 2B:
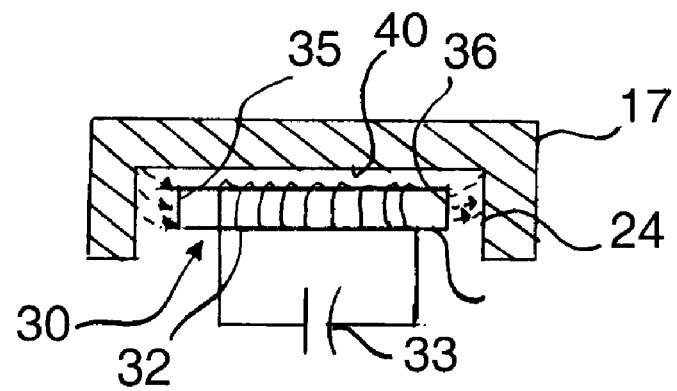
FIG. 2b is a partial cross-sectional lateral view of a valve box lid with an electromagnetic resonator disposed therein.

Based upon these observations, we constructed a number of resonators 30, as shown in FIG. 2a, using commercial ferrite rods 31. Coils 32 were wound as a single layer solenoid on these rods. Large gage wire, equivalent to No. 18 or greater diameter, was used to minimize resistive losses. The resonators were tuned to 83 kHz with a single capacitor. As shown in FIGS. 2a and 2b, the resonators are placed in the lid cavity with the rod ends 35, 36 facing the interior faces 24 of the circumferential lip 17. The long axis of the solenoid is parallel to the top surface of the lid.

This combination of lid and resonator was easily locatable with a commercial interrogating device, the 3M EMS II, available from 3M Corporation. By locatable, we mean that the lid and resonator combination was indistinguishable from a commercial tag using this interrogating device.

The range of detection is a strong function of the air gap between the resonator rod and the interior of the lid. Too great or too small an air gap decreased the detection range. By proper sizing of the air gap, an optimum degree of coupling between the lid and the resonator is achievable.

Figure 2C:
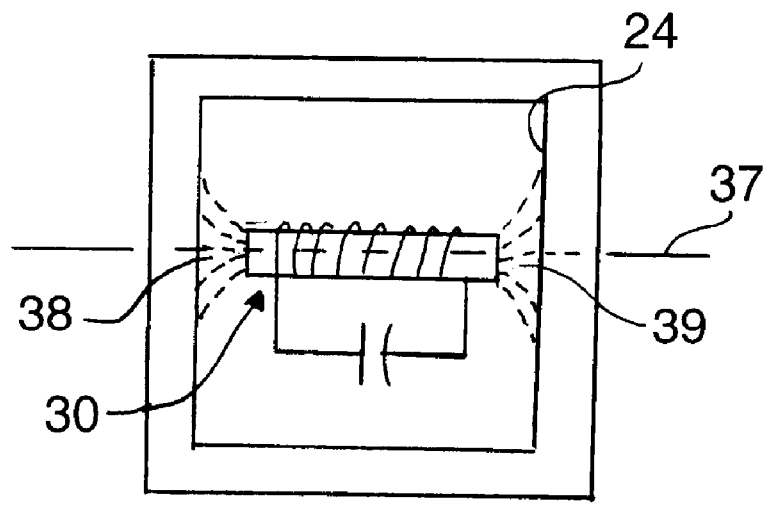
FIG. 2c is a bottom view of a valve box lid and electromagnetic resonator in accordance with one embodiment of this invention.

A 4-inch long ferrite core resonator was installed inside of a square metallic valve box cover on a line 37 bisecting the interior and perpendicular to the interior face 24 of the circumferential lip 17 of the lid 15. (See FIGS. 2b and 2c.) The rod was centered longitudinally such that there were substantially equal air gaps 38, 39 between the rod ends 35, 36 and the opposite faces of the lip 17. The resonator 30 was vertically positioned with spacers such that the ferrite rod 31 was held below the top surface 40 of the lid 15 to a distance of about ¾ of the lip depth. This setup was tuned to 83 kHz and tested using a SCOTCHMARK EMS II locator. The tests were conducted with the cover in place on the valve box riser. The resonator was, thus, completely enclosed in the metallic box. In spite of this, the setup was easily detectable from a distance of 12–18 inches, a range which is sufficient for this application. Under normal conditions, the valve cover will be at ground level or, at worst, covered with a few inches of asphalt or other paving.

Figure 4:
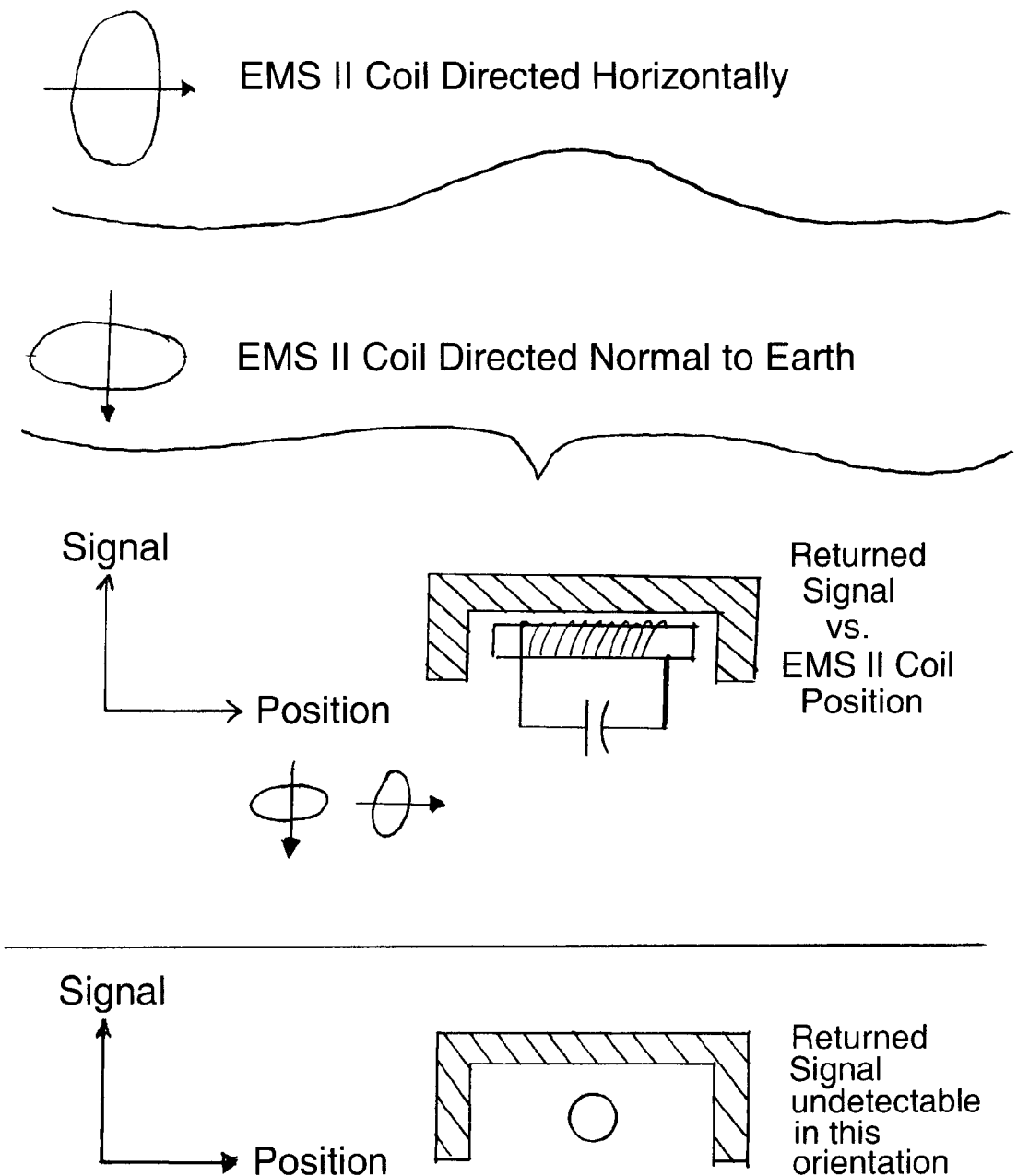
FIG. 4 is a diagram showing the method of locating and identifying a valve box in accordance with one embodiment of this invention.

There is a distinct detection pattern caused by the interaction of the marker system and the EMS II locator. The normal orientation for the EMS II antenna coil is with the axis of the coil pointed into the earth. In this orientation, the maximum return signal is found when the edges of the box lid facing the open ends of the resonator bisect the EMS II coil. FIG. 4 shows the strength of the return signal as the EMS II coil is swept past the lid-resonator system. There is a null in the return signal at the center of the lid. When the EMS II antenna is oriented with its axis parallel to the earth, the maximum return signal is found in the center of the lid. If the EMS II coil is swept perpendicular to the axis of the resonator and through the center of the lid, there is a null in the returned signal.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In a valve box comprising a metallic riser and a metallic lid covering a top opening of said metallic riser, the improvement comprising:

an electromagnetic resonator coupled to a valve box interior facing side of said metallic lid, whereby upon generation of an eddy current in said metallic lid, a current is generated in said electromagnetic resonator.

2. In a valve box in accordance with claim 1, wherein said electromagnetic resonator comprises an inductor wound on a ferrite rod in parallel with a capacitor.

3. In a valve box in accordance with claim 1, wherein said metallic lid comprises a circumferential lip projecting in a direction of said metallic riser.

4. In a valve box in accordance with claim 3, wherein said electromagnetic resonator is coupled to said metallic lid by means of an appropriately dimensioned air gap between the ends of said ferrite rod and said circumferential lip.

5. In a valve box in accordance with claim 1, wherein said electromagnetic resonator is coupled to said metallic lid by means of an appropriately dimensioned air gap between said metallic lid and said ferrite rod.

6. In a valve box in accordance with claim 1, wherein said electromagnetic resonator is disposed in an enclosure sized to achieve said coupling upon bonding of said enclosure to said metallic lid.

7. In a valve box in accordance with claim 1, wherein said metallic lid is constructed of cast iron.

8. A method for identifying buried valve boxes used in gas and water distribution systems comprising the steps of:

coupling an electromagnetic resonator to a valve box interior facing side of a valve box metallic lid such that, upon generation of an eddy current in said metallic lid, a current is generated in said metallic resonator;

generating an eddy current in said metallic lid by activating an above ground interrogating device, resulting in generation of said current in said electromagnetic resonator and storage of energy in said electromagnetic resonator;

deactivating said interrogating device, resulting in dissipation of said energy stored in said electromagnetic resonator in a form of radio waves; and detecting said radio waves with an above ground receiver, whereby the identification and location of said buried valve box is determined.

9. A method in accordance with claim 8, wherein said electromagnetic resonator comprises an inductor wound on a ferrite rod in parallel with a capacitor.

10. A method in accordance with claim 8, wherein said coupling of said electromagnetic resonator to said metallic lid is provided by positioning said electromagnetic resonator so as to maintain an appropriately dimensioned air gap between said metallic lid and said ferrite rod.

11. A method in accordance with claim 10, wherein said electromagnetic resonator is positioned such that said air gap is disposed between the ends of said ferrite rod and a circumferential lip of said metallic lid oriented toward a bottom of said buried valve box.

* * * * *